May 28, 1963     E. L. KILAYKO     3,091,254
DUAL SEATING BALL CHECK VALVE
Filed Nov. 24, 1961
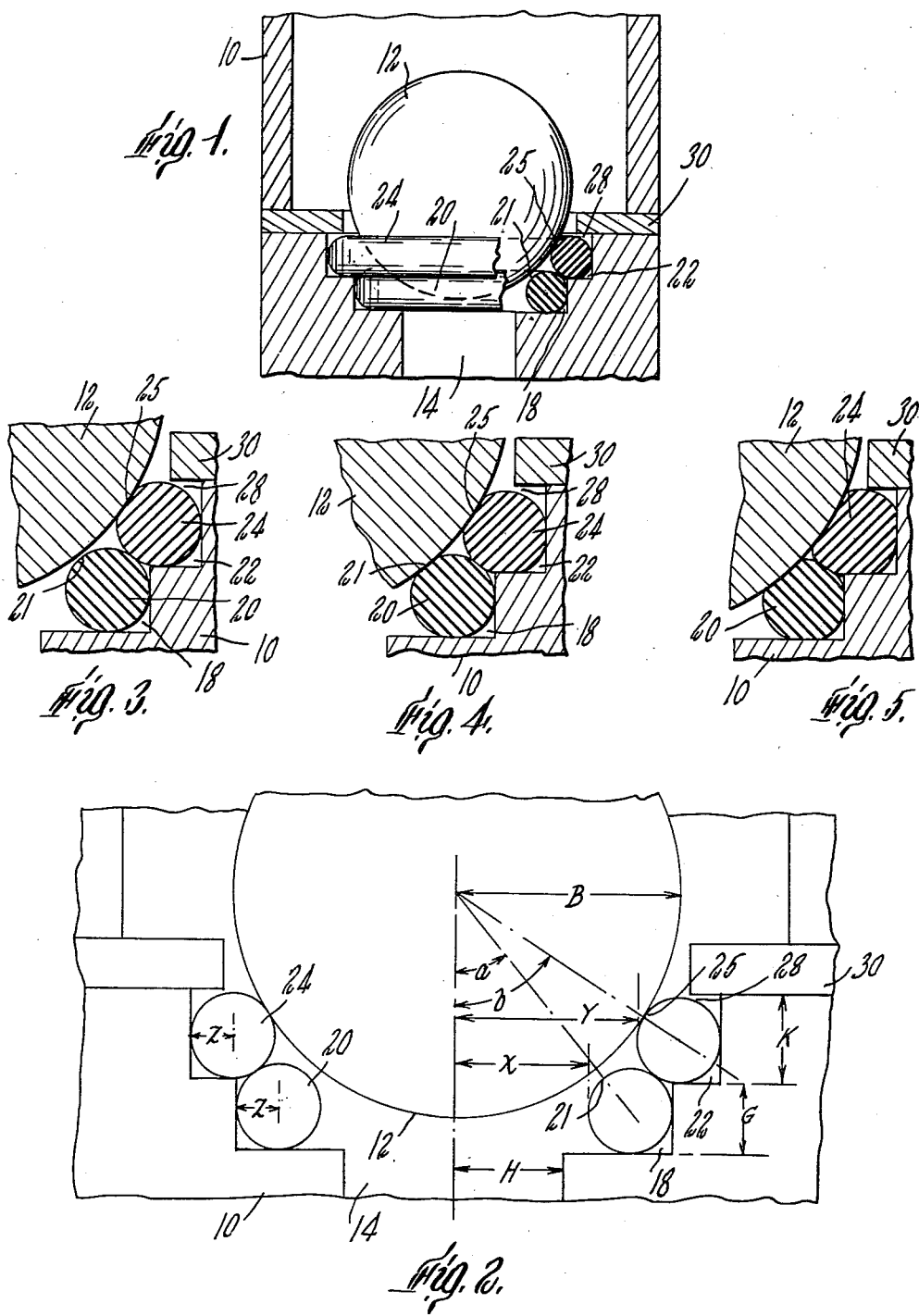

United States Patent Office 3,091,254
Patented May 28, 1963

3,091,254
DUAL SEATING BALL CHECK VALVE
Enrique L. Kilayko, Cambridge, Mass., assignor to Precision Chemical Pump Corporation, Waltham, Mass., a corporation of Massachusetts
Filed Nov. 24, 1961, Ser. No. 154,699
3 Claims. (Cl. 137—516.29)

This invention relates to a ball check valve, more particularly to a dual seating ball valve especially useful at pressures in excess of 100 p.s.i., wherein the seat is comprised of an elastomeric material.

Although check valves having seating means of relatively soft, elastomeric materials are old in the art, it has not been known how to fabricate such check valves which would be operable at pressures in excess of 100 p.s.i. This is because at such high pressures, the valve seat of the standard check valve can be shown to require a hardness of at least 85 durometer to prevent seal failure, even though it is known that softer elastomeric materials, having a hardness in the range of 50 to 70 durometer provide much better sealing action, being more resilient.

It is, therefore, a primary object of this invention to provide a ball check valve, having relatively soft elastomeric seating means, which is operable at pressures in excess of 100 p.s.i.

It is also an object of this invention to provide, in a check valve, seating means which have a self-cleaning action.

Finally, it is an object of this invention to provide a ball check valve which is exceedingly simple and inexpensive to manufacture.

In general, this invention comprises a ball within a ported valve body having, disposed between and concentrically of the ball and the valve port, seating means comprising a plurality of annular sealing surfaces of resilient elastomeric material, preferably of progressively smaller diameters in a direction away from the ball and toward the port. Moreover, the sealing surfaces are disposed in such a manner that as the ball descends upon them to close the valve, it preferably contacts sequentially the larger and then the smaller of said surfaces.

Further features, advantages, and objects of this invention will be appreciated by those skilled in the art from the following detailed description of a preferred embodiment thereof and from the accompanying drawings, wherein:

FIG. 1 is a side elevation of a preferred embodiment of the valve partly in section showing the ball in a partially seated position;

FIG. 2 is a diagrammatic enlarged view of FIG. 1 showing the elements of the invention in detail and in their respective proportions; and FIGS. 3, 4, and 5 are sectional views of FIG. 1 showing the ball in progressive stages of sequential seating.

The drawings show only that portion of the valve wherein the seating means and related structure are located and do not attempt to show the remainder of the valve as such remaining structure is standard and well known to those skilled in the valve art.

Referring now to the drawings, there is shown within a valve body generally designated by the numeral 10, movable valve closure or sealing means in the nature of a ball 12. The ball 12 is substantially larger than the fluid port 14, the ratio of the radius of the ball 12 to that of the port 14 being preferably at least 2 to 1. Positioned between the ball 12 and the port 14 are the seating means comprising, in the preferred embodiment of the invention two annular rings 20 and 24, shown as O-rings concentrically disposed inwardly of and about the port. The rings 24 and 20 are made of a resilient, preferably elastomeric substance, such as rubber, synthetic rubber, plastic or the like, having a hardness of 50 to 70 durometer, and respectively comprise the inner and outer seating means, the inner seating means 24 being that seating means adjacent said ball 12 and the outer seating means 20 being that seating means most remote from said ball 12. The inner and outer seating means 24 and 20 have respectively inner and outer sealing surfaces numbered 25 and 21, said sealing surfaces being defined by the points at which the ball 12 first contacts the inner and outer seating means 24, 20.

The outer seating means 20 is positioned within an outer seating cavty 18 having a radius equal to the outer radius of the outer seating means and a vertical height greater than one half a vertical dimension of the outer seating means. The outer seating means 20 has an inner radius slightly larger than that of the inlet 14.

The inner seating means 24 has an inner radius larger than that of the outer means 20 and is positioned within an inner seating cavity 22. Preferably, the outer and inner seating means 20 and 24 are positioned in face-contacting relation as shown in the drawings. The radius of the inner seating cavity is equal to the outer radius of the inner seating means 24 and has a vertical height at least as great as the vertical dimension of the inner seating means 24.

The effective diameters of the sealing surfaces 25, 21 are progressively smaller, following in sequence from the inner to the outer, such that the seating of the ball 12 upon the sealing surface is nonsimultaneous. Although the sealing arrangement is operable if the seating is simultaneous or in reverse sequence, as will be shown, it is not as effective as when the sequence follows the previously described order nor is it desirable. Thus when the ball first seats on the inner seating means 24, it overlies in spaced relation to the sealing surface of the outer sealing means 20 as is clearly shown in FIGS. 1, 2, and 3.

The most effective seating angles of the sealing surfaces 21, 25, defined by the angles between the vertical axis of the valve 10 and lines extending from the center of the ball 12 to the sealing surfaces 21, 25, have been discovered to be ln the range of 57 to 60 degrees for the inner sealing surface 25, and in the range of 38 to 41 degrees for the outer sealing surface 21. Because of the seating angle of the inner seating means 24, it is readily apparent that the inner seating means 24 provides a rather inefficient seal. Thus, the sealing action itself is left primarily to the outer seating means 20.

Positioned inwardly of the inner seating means 24 and extending in transverse direction inwardly from the valve body 10 are, in the preferred embodiment of this invention, short spaced ribs comprising retaining means 30 effective to hold the inner seating means 24 in its predetermined position. The inner seating means 24 operates in turn to hold the outer seating means 20 in its predetermined position when the seating means are in face-contacting relation. Preferably, the retaining means 30 extends inwardly less than one half the wall diameter of the inner seating means 24 to provide an opening 28 therebetween which permits the seating means 20 and 24 to move slightly when the valve is open. This permits liquid to flow beneath and around the seating means and thus provides a self-cleaning action which extends the wear of the seating means.

The specific preferred embodiment of this invention which is given by way of example only is most clearly disclosed in FIG. 2. The dimensions of the valve and its parts are there shown by letters. Thus, the radius of the port 14 is H; the radius of the ball 12 is B; the wall radii of the annular rings 20, 24 are Z; the inner radius of the outer seating means 20 is X and its seating angle is $a$; the inner radius of the inner seating means 24 is Y and its seating angle is $b$; the vertical height of the outer seating cavity is G and that of the inner seating cavity is K. The relationships of the various parts to one another may be expressed in the following formulae:

$$B = 2H$$
$$Z = \frac{1}{6}B$$
$$K = 2.08 \text{ to } 2.4Z$$
$$G = 1.65 \text{ to } 1.70Z$$

$$\text{sine of } a = \frac{X+Z}{B+Z} = 0.640$$

$$\text{sine of } b = \frac{Y+Z}{B+Z} = 0.857$$

Using the proportions thus set forth, a valve of the type described is attained wherein the seating of the ball in the seating means 20, 24 is sequential.

In operation, in its open position, fluid passes readily through the valve body 10. The seating means 20, 24 are retained in position by the retaining means 30. Because the retaining means 30 is spaced somewhat from the inner seating means 24, however, the seating means are permitted to move somewhat from the seating cavities 18, 22 and the fluid thus is permitted to flow beneath and behind the sealing means and thus provides a self-cleaning tendency of the seating means. The cleaning action thus engendered aids in prolonging the life span of the seating means as it reduces wear upon them otherwise encountered when small solid particles lodge behind them.

As the fluid pressure reverses, it operates to close the valve and the ball 12 moves toward the port and first seats on the sealing surface 25, of the inner seating means 24 as shown in FIGS. 1 and 2. As is clearly shown in the drawings, the ball 12 then overlies in spaced relationship the outer seating means 20. As pressure behind the ball 12 continues to increase, the ball begins to distort the surface 25 of the inner seating means 24 as in FIG. 3 and ultimately distorts the surface 25 of the inner seating means sufficiently to bring the ball 12 into a contacting relation with the sealing surface 21 of the outer seating means 20 as in FIG. 4. As the ball 12 becomes fully seated, both seating means 20, 24 are distorted as in FIG. 5 and an effective double seal is formed.

As has been previously noted the inner seating means 24 provides a relatively ineffective seal. However, the inner seating means 24, because it is contacted by the ball 12 first operates to reduce the initial impact of the ball on the outer seating means 20. When contact is made between the ball and the outer seating means 20, the pressure exerted upon the seating means 20, 24 then tends to equalize.

Although the valve would be operable were the seating sequence reversed or simultaneous, such an arrangement is not desirable as the outer seal 20 would then bear a greater impact and ultimate load than would the inner seal 24; this would result in a greater rate of wear of the outer seal which would lead to a relatively rapid failure. The present arrangement reduces the wear upon the outer seal, which provides the greater sealing action, and thus provides a highly effective seal which is infrequently subject to failure.

The valve thus produced is operable at pressures far in excess of 100 p.s.i., despite the relative softness of its seating means. Thus, by this invention a valve is obtained for operation at high pressures wherein a relatively soft material may be used as the seating means thus to provide a highly effective seal. Additionally, wear upon the seating means is reduced to prolong their useful life and a self-cleaning action is provided for the seating means. Because of their relative softness and because of the simple valve arrangement, the valve provided by this invention is simple and inexpensive to manufacture.

It will be understood that the specific embodiments of the invention described herein are given by way of example only and are not intended in any way to limit the scope of this invention as those skilled in the art will appreciate that many variations in detail may be made without departing from the true spirit and scope of the claims.

What I claim is:

1. In a check valve having a port: sealing means comprising a ball movable toward and away from said port, said ball having a diameter substantially larger than the largest dimension of said port; seating means positioned between said ball and said port comprising inner and outer circular rings of an elastomeric substance having a hardness in the range of 50–70 durometer and having respectively inner and outer circular sealing surfaces; inner and outer seating cavities embracing said seating means; said sealing surfaces having sequentially decreasing diameters progressively remote from said ball; said surfaces being arranged for contact with said ball in a sequence progressively remote from said ball on movement from said ball toward said port, such that when said ball strikes said inner surface it overlies in spaced relation said outer surface; said inner surface having a seating angle in the range of 57–60 degrees and said outer surface having a seating angle in the range of 38–41 degrees.

2. The valve claimed in claim 1 wherein said rings comprise O-rings in face-contacting relation.

3. The valve claimed in claim 2 wherein the proportions of the elements thereof relative to each other may be expressed in the formulae:

$$B = 2H$$
$$Z = \frac{1}{6}B$$
$$K = 2.08 \text{ to } 2.4Z$$
$$G = 1.65 \text{ to } 1.70Z$$

$$\text{Sine } a = \frac{X+Z}{B+Z} = 0.640$$

$$\text{Sine } b = \frac{Y+Z}{B+Z} = 0.857$$

where B is the radius of said ball, H is the radius of said port, Z is the wall radius of said circular O-rings, G is the vertical height of said outer seating cavity, K is the vertical height of said inner seating cavity, X is the inner radius of said outer circular O-ring, Y is the inner radius of said inner circular O-ring, $a$ is the seating angle of said outer sealing surface, and $b$ is the seating angle of said inner sealing surface.

References Cited in the file of this patent

UNITED STATES PATENTS

| | | |
|---|---|---|
| 2,409,220 | Melichar | Oct. 15, 1946 |
| 2,929,401 | Cowan | Mar. 22, 1960 |
| 2,930,401 | Cowan | Mar. 29, 1960 |